(12) United States Patent
Li

(10) Patent No.: US 9,535,209 B2
(45) Date of Patent: Jan. 3, 2017

(54) BACKLIGHT SOURCE AND DISPLAY APPARATUS

(71) Applicants: BOE Technology Group Co., Ltd., Beijing (CN); BOE Optical Science and Technology Co., Ltd., Suzhou (CN)

(72) Inventor: Wenjun Li, Beijing (CN)

(73) Assignees: BOE Technology Group Co., Ltd., Beijing (CN); BOE Optical Science and Technology Co., Ltd., Suzhou (CN)

( * ) Notice: Subject to any disclaimer, the term of this patent is extended or adjusted under 35 U.S.C. 154(b) by 54 days.

(21) Appl. No.: 14/743,016

(22) Filed: Jun. 18, 2015

(65) Prior Publication Data

US 2016/0282552 A1     Sep. 29, 2016

(30) Foreign Application Priority Data

Mar. 25, 2015   (CN) ..................... 2015 2 0172714 U

(51) Int. Cl.
  *F21V 8/00*    (2006.01)
  *G02F 1/1335*  (2006.01)

(52) U.S. Cl.
  CPC ............. *G02B 6/0088* (2013.01); *G02B 6/009* (2013.01); *G02B 6/0093* (2013.01); *G02F 1/133615* (2013.01)

(58) Field of Classification Search
  CPC . G02F 1/133615; G02B 6/009; G02B 6/0093; G02B 6/0088
  See application file for complete search history.

(56) References Cited

U.S. PATENT DOCUMENTS 9,389,354 B2 *  7/2016  Yu ........................ G02B 6/0031

* cited by examiner

*Primary Examiner* — Dung Nguyen
(74) *Attorney, Agent, or Firm* — Westman, Champlin & Koehler, P.A.

(57) ABSTRACT

The present disclosure provides a backlight source and a display apparatus. It relates to the field of display technology and solves the problem of poor display quality of the display apparatus. The backlight source comprises: a light guide plate; a light shielding tape arranged at a peripheral edge of a light emitting face of the light guide plate; a buffer layer arranged on the light shielding tape, wherein the buffer layer is provided with at least one lightening hole and/or at least one marking hole representing product information of the backlight source. The above backlight source may reduce the weight of the buffer layer by providing the lightening hole and/or marking hole on the buffer layer, so as to reduce the pressure of the buffer layer to the light shielding tape. In this way, the deformation in the light shielding tape 1 is reduced so as to improve display quality of the display apparatus.

15 Claims, 4 Drawing Sheets

BACKLIGHT SOURCE AND DISPLAY APPARATUS

CROSS-REFERENCE TO RELATED APPLICATION

This application claims the benefit of Chinese Patent Application No. CN201520172714.0 filed on Mar. 25, 2015 in the State Intellectual Property Office of China, the whole disclosure of which is incorporated herein by reference.

BACKGROUND OF THE INVENTION

Field of the Invention

The present disclosure relates to the field of display technology, in particular, relates to a backlight source and a display apparatus.

Description of the Related Art

In the conventional display apparatus, its liquid crystal panel may be broken when the display apparatus falls. For this problem, some solutions for improving the structure of the backlight source of the display apparatus have proposed in the prior art, however, the improved display apparatus has a poor display effect.

SUMMARY OF THE INVENTION

An object of the present disclosure is to provide a backlight source and a display apparatus that can improve the display quality of the display apparatus.

In view of the above, an embodiment of the present invention provides a backlight source, comprising: a light guide plate; a light shielding tape arranged at a peripheral edge of a light emitting face of the light guide plate; a buffer layer arranged on the light shielding tape, wherein the buffer layer is provided with at least one lightening hole and/or at least one marking hole representing product information of the backlight source.

An embodiment of the present invention also provides a display apparatus comprising a liquid crystal panel and a backlight source described as above, wherein the buffer layer in the backlight source is in contact with the liquid crystal panel.

BRIEF DESCRIPTION OF THE DRAWINGS

The present disclosure will be understood more apparently with reference to the following drawings which constitute a part of the present disclosure. The embodiments of the present invention are intended to interpret the present invention, but are not intended to define the present invention reasonably. In the drawings.

Figure 1:
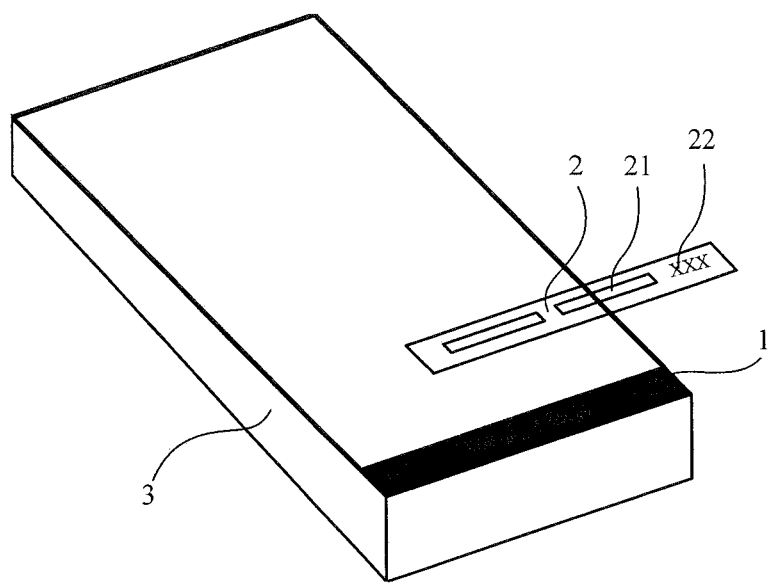
FIG. 1 is a first schematic view showing a structure of a backlight source according to an embodiment of the present invention.

| Reference Numerals |
| --- |
| 1: light shielding tape |
| 2: buffer layer |
| 3: light guide plate |
| 4: protective layer |
| 21: lightening hole |
| 22: marking hole |

DETAILED DESCRIPTION OF PREFERRED EMBODIMENTS OF THE INVENTION

Exemplary embodiments of the present disclosure will be described in detail with reference to the attached drawings. The embodiments are only given by way of examples, instead of all of embodiments of the present invention.

First Embodiment

As illustrated in FIG. 1, an embodiment of the present invention provides a backlight source, including: a light guide plate 3, a light shielding tape 1 and a buffer layer 2. The light shielding tape 1 is arranged at a peripheral edge of a light emitting face of the light guide plate 3. The buffer layer 2 is arranged on the light shielding tape 1. And the buffer layer 2 is provided with at least one lightening hole 21 and/or at least one marking hole 22 representing product information of the backlight source. In an example, the buffer layer 2 has a width less than or equal to that of the light shielding tape 1. In order to increase the buffer effect of the buffer layer 2, in the embodiment, the width of the buffer layer 2 is identical to that of the light shielding tape 1. When the above backlight source and the liquid crystal panel are assembled together, the buffer layer 2 in the backlight source is in contact with the liquid crystal panel.

In the above backlight source, as the buffer layer 2 is provided with at least one lightening hole 21 and/or at least one marking hole 22 representing product information of the backlight source, the weight of the buffer layer 2 may be reduced while the thickness of the buffer layer 2 is kept constant, so as to reduce the pressure of the buffer layer 2 to the light shielding tape 1 located below it. In this way, the deformation in the light shielding tape 1 is reduced so as to improve display quality of the display apparatus.

During manufacturing the display apparatus, generally, its backlight source may be supplied by a plurality of companies. As the backlight sources have identical appearance, it cannot be identified which company the backlight sources are produced by. In this way, once the backlight source is wrong, the company producing it will not be determined correctly. In the prior art, in consideration of this problem, when producing the backlight source, the companies that produce the respective backlight sources respectively may be distinguished from each other by spraying codes on the backlight source. The codes may be marker of the company producing the backlight source. In order to distinguish different bitches of backlight sources produced by the same company, the codes representing product information may also be sprayed on the backlight source. However, the operation process of spraying codes is complex and has a low work efficiency and high production cost.

Figure 5:
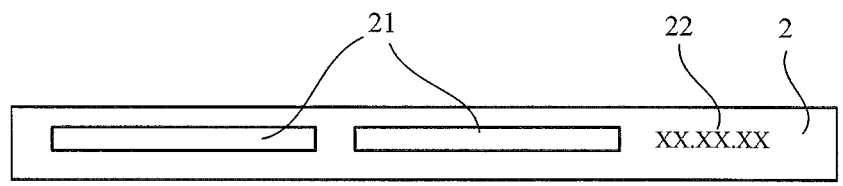
FIG. 5 is a fourth schematic view showing a structure of a buffer layer according to an embodiment of the present invention.
Figure 6:
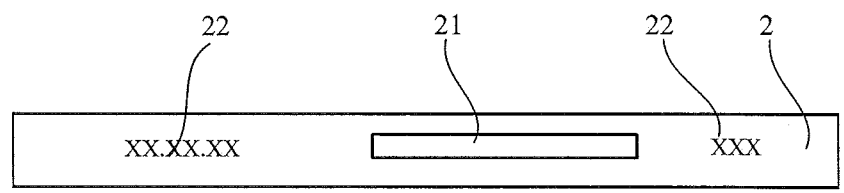
FIG. 6 is a fifth schematic view showing a structure of a buffer layer according to an embodiment of the present invention.
Figure 7:
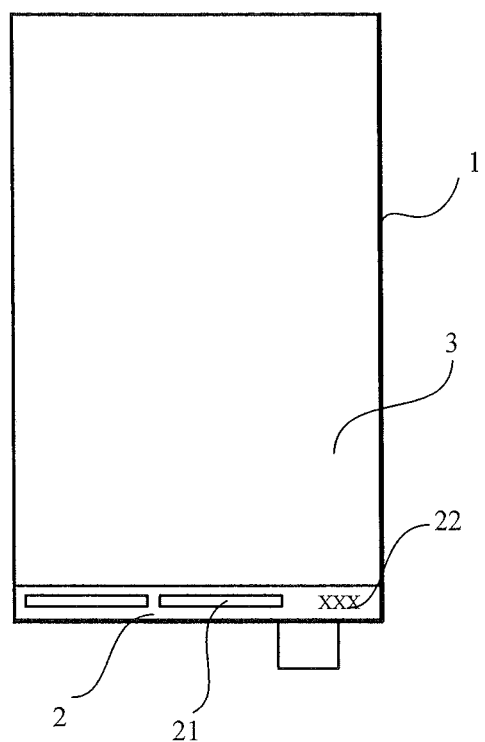
FIG. 7 is a front view showing a backlight source according to an embodiment of the present invention.

In order to save the process for spraying codes on the backlight source, with reference to FIGS. 5-7, the buffer layer 2 is provided with the marking holes 22 thereon. These marking holes 22 may also have a marking function besides the lightening function. The marking hole 22 may represent marker or product information for the company that produces the backlight sources. As shown in FIG. 5, the buffer layer 2 is provided with two rectangular lightening holes 21 therein and there is one marking hole 22 representing the product information in the right region of the buffer layer 2. As shown in FIG. 6, there is a marking hole 22 representing the product information in the left region of the buffer layer 2. One rectangular lightening hole 21 is arranged in a central region of the buffer layer 2, and there is one marking hole 22 representing the product information in the right region of the buffer layer 2. The lightening hole 21 in the buffer layer 2 is designed as a marking hole 22 representing the marker of the product information or the company producing the backlight source. It contributes to distinguishing the backlight sources produced by different companies from each other and to distinguishing different bitches of the backlight sources produced by the same company from each other while saving the process for spraying codes on the backlight source and reducing the costs of spraying codes. In addition, it also contributes to promotion and propaganda of companies producing the backlight sources.

In an example, the lightening hole 21 is a hole which is arranged in the buffer layer 2 and does not pass through the buffer layer 2 in thickness, or a through hole passing through the buffer layer 2 in thickness. In order to further reduce the weight of the buffer layer 2, in the embodiment, the lightening hole 21 is the through hole passing through the buffer layer 2 in thickness. Similarly, the marking hole 22 is a hole which is arranged in the buffer layer 2 and does not pass through the buffer layer 2 in thickness, or a through hole passing through the buffer layer 2 in thickness. In order to further reduce the weight of the buffer layer 2, in the embodiment, the marking hole 22 is the through hole passing through the buffer layer 2 in thickness.

Figure 2:
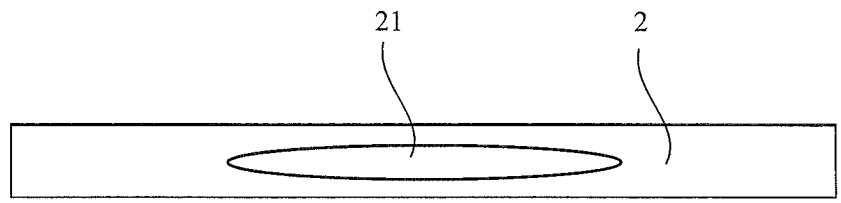
FIG. 2 is a first schematic view showing a structure of a buffer layer according to an embodiment of the present invention.
Figure 3:
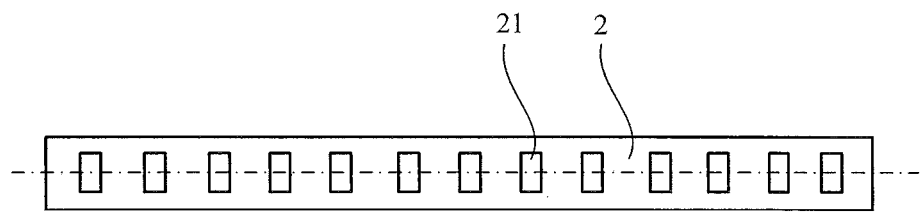
FIG. 3 is a second schematic view showing a structure of a buffer layer according to an embodiment of the present invention.
Figure 4:
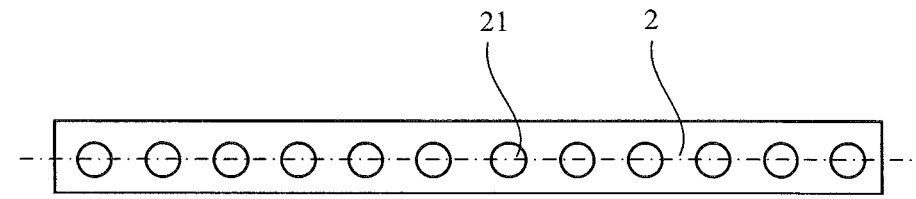
FIG. 4 is a third schematic view showing a structure of a buffer layer according to an embodiment of the present invention.

The above lightening hole 21 may have any shapes. For convenience of production, the shape of the lightening hole 21 may be a regular graph such as a circle, a rectangle or an ellipse, that is, the lightening hole 21 may be a circular hole, a rectangular hole or an elliptical hole. One or more lightening hole 21 may be provided. As illustrated in FIG. 2, only one lightening hole 21 is arranged on the buffer layer 2, the lightening hole 21 being an elliptical hole located in central region of the buffer layer 2, and the elliptical lightening hole 21 has a long axis which extends in the same direction as the lengthwise direction of the buffer layer 2. As illustrated in FIG. 3, a plurality of lightening holes 21 which are rectangular holes are provided, the plurality of rectangular lightening holes 21 being arranged uniformly along the lengthwise direction of the buffer layer 2. The rectangular lightening holes arranged uniformly cause the pressure of the buffer layer 2 to the light shielding tape 1 to become more uniform so as to reduce the deformation of the light shielding tape 1. As illustrated in FIG. 4, a plurality of lightening holes 21 which are circular holes are provided, the plurality of circular lightening holes 21 being arranged uniformly along the lengthwise direction of the buffer layer 2. The circular lightening holes arranged uniformly cause the pressure of the buffer layer 2 to the light shielding tape 1 to become more uniform so as to reduce the deformation of the light shielding tape 1.

When only lightening hole 21 is arranged on the above buffer layer 2, in order to ensure the buffer effect of the buffer layer 2, one lightening hole 21 has a volume occupying ⅓-½ of the volume of the buffer layer 2 when only one lightening hole 21 is provided, or a plurality of lightening holes 21 have a total volume occupying ⅓-½ of the volume of the buffer layer 2 when the plurality of lightening hole 21 are provided. In this way, the weight of the buffer layer 2 may be reduced while ensuring the buffer effect of the buffer layer 2. The above light shielding tape 1 is arranged on peripheral edge of the light emitting face of the light guide plate 3. The buffer layer 2 is arranged on the light shielding tape 1 corresponding to the peripheral edge of the light emitting face of the light guide plate 3. Or, as illustrated in FIG. 7, the buffer layer 2 is arranged on the light shielding tape 1 corresponding to a light incidence side of the light guide plate 3. In this way, the weight of the buffer layer 2 may be further reduced. In such design, the weight of the buffer layer 2 may be reduced while the buffer layer 2 has the buffering function between the liquid crystal panel and the backlight source. In this way, the deformation in the light shielding tape 1 is reduced so as to improve display quality of the display apparatus.

The thickness of the buffer layer 2 may be provided on the basis of different requirements for buffer effects of different backlight sources. In order to take desired buffer effects, in the embodiment, the buffer layer has a thickness of 0.05 mm-0.1 mm, for example, it may be provided as 0.05 mm, 0.075 mm or 0.1 mm. Within the above thickness range, the buffer layer 2 has a desired buffer function between the backlight source and the liquid crystal panel while having a relatively low pressure to the light shielding tape 1. It should be noted that the color of the above buffer layer 2 may be white, black, grey or transparent. The buffer layer may be a rubber layer or a polyester resin layer. In the embodiment, it is the polyester resin layer as it is wear-resistant and has a better buffer effect.

Figure 8:
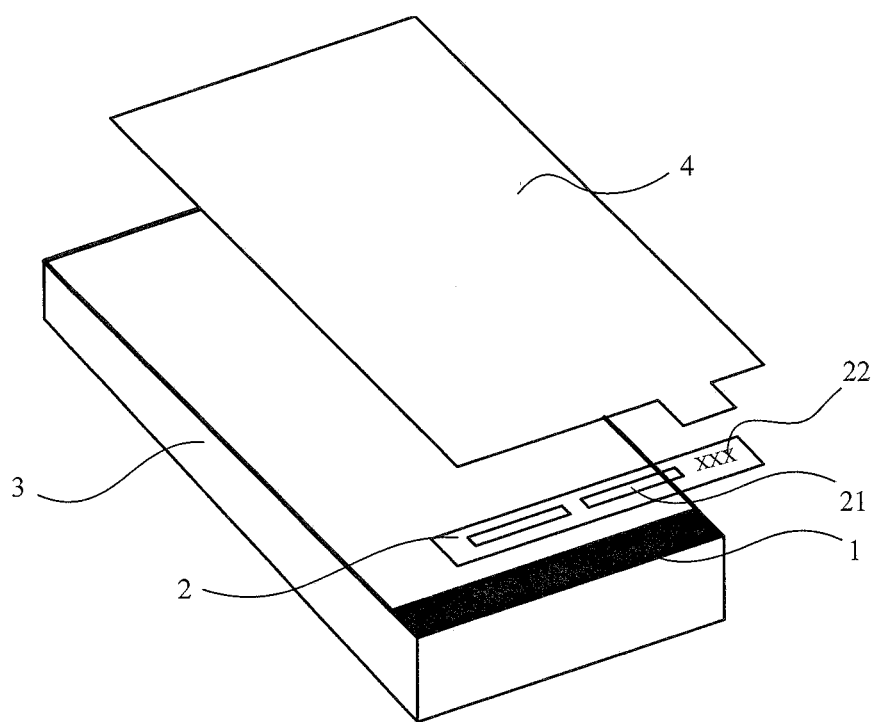
FIG. 8 is a second schematic view showing a structure of a backlight source according to an embodiment of the present invention.

Before the backlight source contacts with the liquid crystal panel, in order to prevent foreign matter such as dust from falling on the light shielding tape 1 and the buffer layer 2, with reference to FIG. 8, in the embodiment, the backlight source further includes a protective layer 4 located above the light shielding tape 1, the buffer layer 2 being located between the protective layer 4 and the light shielding tape 1. Before the backlight source and the liquid crystal panel are assembled together, the protective layer 4 is adhered to the light shielding tape 1 and the buffer layer 2 to prevent foreign matter such as dust from falling on the light shielding tape 1 and the buffer layer 2. When the backlight source and the liquid crystal panel need to be assembled together, the protective layer 4 is firstly removed from above the light shielding tape 1, and then the backlight source and the liquid crystal panel are aligned with each other. After the backlight source and the liquid crystal panel are assembled together, the buffer layer 2 on the light shielding tape 1 is in contact with the liquid crystal panel.

Second Embodiment

The second embodiment of the present invention provides a display apparatus with a liquid crystal panel which is provided with a backlight source provided by the above first embodiment. The buffer layer in the backlight source is in contact with the liquid crystal panel. With reference to FIG.

1, in the above display apparatus provided by the second embodiment of the present invention, as the buffer layer 2 of the backlight source is provided with at least one lightening hole 21 and/or at least one marking hole 22 representing information of product bitch, the weight of the buffer layer 2 may be reduced while the thickness of the buffer layer 2 is kept constant, so as to reduce the pressure of the buffer layer 2 to the light shielding tape 1 located below it. In this way, the deformation in the light shielding tape 1 is reduced so as to improve display quality of the display apparatus.

It should be noted that the above display apparatus may be any products or components having display function such as display panel, electronic paper, cell phone, tablet computer, TV, notebook computer, digital photo frame, navigator.

In the above backlight source and display apparatus provided by the above embodiments of the present invention, as the buffer layer of the backlight source is provided with lightening hole and/or marking hole 22 therein, the weight of the buffer layer may be reduced while the thickness of the buffer layer is kept constant, so as to reduce the pressure of the buffer layer to the light shielding tape. In this way, the deformation in the light shielding tape 1 is reduced so as to improve display quality of the display apparatus.

In the above description of embodiments, the specific features, structure, materials or characteristics may be combined in suitable manner in any one or more embodiment or example.

Although several exemplary embodiments have been shown and described, the present invention is not limited to those and it would be appreciated by those skilled in the art that various changes, equivalents or modifications may be made in these embodiments without departing from the principles and spirit of the disclosure, the scope of which is defined in the claims and their equivalents.

What is claimed is:

1. A backlight source, comprising:
   a light guide plate;
   a light shielding tape arranged at a peripheral edge of a light emitting face of the light guide plate;
   a buffer layer arranged on the light shielding tape,
   wherein the buffer layer is provided with at least one lightening hole and/or at least one marking hole representing product information of the backlight source.

2. The backlight source according to claim 1, wherein the lightening hole and/or marking hole are/is through hole(s) passing through the buffer layer in thickness.

3. The backlight source according to claim 2, further comprising a protective layer located above the light shielding tape, the buffer layer being located between the protective layer and the light shielding tape.

4. The backlight source according to claim 1, wherein the lightening hole and/or marking hole are/is hole(s) which do/does not pass through the buffer layer in thickness.

5. The backlight source according to claim 4, further comprising a protective layer located above the light shielding tape, the buffer layer being located between the protective layer and the light shielding tape.

6. The backlight source according to claim 1, wherein the lightening hole is a circular hole, a rectangular hole or an elliptical hole.

7. The backlight source according to claim 6, further comprising a protective layer located above the light shielding tape, the buffer layer being located between the protective layer and the light shielding tape.

8. The backlight source according to claim 1, wherein the buffer layer is arranged on the light shielding tape corresponding to a light incidence side of the light guide plate.

9. The backlight source according to claim 8, further comprising a protective layer located above the light shielding tape, the buffer layer being located between the protective layer and the light shielding tape.

10. The backlight source according to claim 1, wherein the buffer layer is a rubber layer or a polyester resin layer.

11. The backlight source according to claim 10, further comprising a protective layer located above the light shielding tape, the buffer layer being located between the protective layer and the light shielding tape.

12. The backlight source according to claim 1, wherein the buffer layer has a thickness of 0.05 mm-0.1 mm.

13. The backlight source according to claim 12, further comprising a protective layer located above the light shielding tape, the buffer layer being located between the protective layer and the light shielding tape.

14. The backlight source according to claim 1, further comprising a protective layer located above the light shielding tape, the buffer layer being located between the protective layer and the light shielding tape.

15. A display apparatus comprising a liquid crystal panel and a backlight source according to claim 1, wherein the buffer layer in the backlight source is in contact with the liquid crystal panel.

* * * * *